United States Patent
Knox et al.

(10) Patent No.: US 10,035,439 B2
(45) Date of Patent: Jul. 31, 2018

(54) VEHICLE SEAT ACTIVE SUSPENSION CONTROL BASED ON VEHICLE POSITION

(71) Applicant: ClearMotion Acquisition I LLC, Woburn, MA (US)

(72) Inventors: Lawrence D. Knox, Hopkinton, MA (US); Antonio Sangermano, II, Rindge, NH (US)

(73) Assignee: ClearMotion Acquisition I LLC, Woburn, MA (US)

( * ) Notice: Subject to any disclaimer, the term of this patent is extended or adjusted under 35 U.S.C. 154(b) by 142 days.

(21) Appl. No.: 15/059,010

(22) Filed: Mar. 2, 2016

(65) Prior Publication Data
US 2017/0253155 A1    Sep. 7, 2017

(51) Int. Cl.
| | |
|---|---|
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2006.01) |
| B60N 2/50 | (2006.01) |
| B60N 2/02 | (2006.01) |

(52) U.S. Cl.
CPC ........... B60N 2/501 (2013.01); B60N 2/0244 (2013.01); *B60N 2002/0272* (2013.01)

(58) Field of Classification Search
CPC .. B60N 2/0244; B60N 2/0248; B60N 2/0232; B60N 2/0252; B60Q 2300/112
USPC .......................................................... 701/49
See application file for complete search history.

(56) References Cited

U.S. PATENT DOCUMENTS

| | | | |
|---|---|---|---|
| 5,432,700 | A | 7/1995 | Hrovat et al. |
| 6,577,948 | B1 | 6/2003 | Skellenger et al. |
| 7,195,250 | B2 | 3/2007 | Knox et al. |
| 7,878,510 | B2 | 2/2011 | Knox et al. |
| 8,095,268 | B2 | 1/2012 | Parison et al. |
| 8,725,351 | B1 | 5/2014 | Selden et al. |
| 2004/0046335 | A1 | 3/2004 | Knox |
| 2014/0358378 | A1 | 12/2014 | Howard et al. |

OTHER PUBLICATIONS

The International Search Report and The Written Opinion of the International Searching Authority dated May 31, 2017 for PCT Application No. PCT/US2017/020120.
Doug Cooper & Allen Houtz, The Feed Forward Controller, Copyright 2008 by Douglas J. Cooper, last downloaded from the Internet Jun. 19, 2014; http://www.controlguru.com/2008/050408.html.

*Primary Examiner* — Maceeh Anwari
(74) *Attorney, Agent, or Firm* — Wolf, Greenfield & Sacks, P.C.

(57) ABSTRACT

A system and method that establishes a confidence in a vehicle position determined by a vehicle position determination system and uses the established confidence to change a behavior of an active suspension system of a plant in the vehicle.

13 Claims, 3 Drawing Sheets

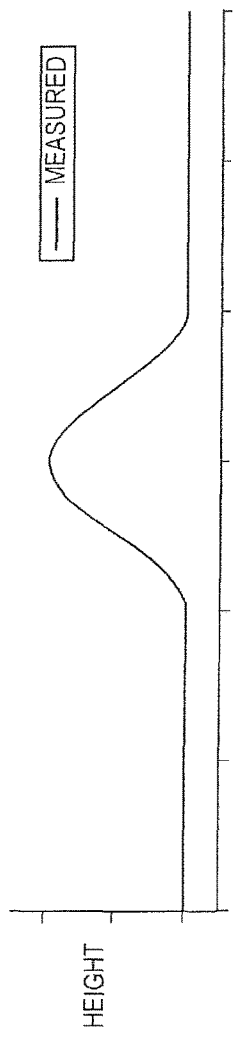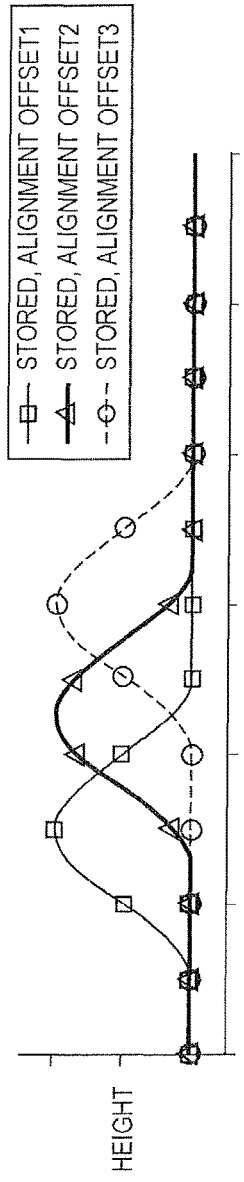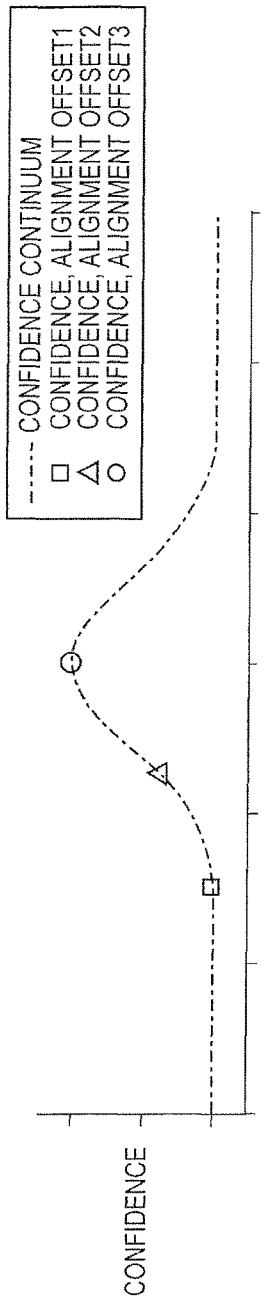

VEHICLE SEAT ACTIVE SUSPENSION CONTROL BASED ON VEHICLE POSITION

BACKGROUND

This disclosure relates to active suspension of a plant in a moving vehicle.

In actively suspended vehicle seats it is typically not possible to have the control system control the seat top to have no acceleration at all frequencies. Normally the control systems are operated so as to limit the low frequency bandwidth that is controlled such that zero acceleration is not maintained at very low frequencies. Rather, at low frequencies the seat top is allowed to follow the truck floor. However, when the seat top follows the floor there is no vibration isolation.

SUMMARY

All examples and features mentioned below can be combined in any technically possible way.

In one aspect, a method includes establishing a confidence in a vehicle position determined by a vehicle position determination system and using the established confidence to change a behavior of an active suspension system of a plant in the vehicle.

Embodiments may include one of the following features, or any combination thereof. The active suspension system may have a controller that outputs commands to an actuator to control motion of the plant. The established confidence may be used to weight the controller commands, so as to weight plant motion. The controller may comprise a feed-forward architecture. The controller may further comprise a feedback architecture. The established confidence may be used to weight the relative contribution to the controller commands from the feed-forward and feedback architectures. In one non-limiting example, when the confidence is high the weight from the feed-forward contribution to the controller is higher than it is when the confidence is low.

Embodiments may include one of the following features, or any combination thereof. The vehicle position determination system may determine an initial vehicle position estimate based on GPS data, record a sequence of sensor data from a sensor located with the vehicle, and refine the initial vehicle position estimate by performing pattern matching that looks for the presence of a known sequence of data obtained from the measured data, in the recorded sequence of sensor data. Pattern matching may be performed by multiplying a sequence consisting of n numbers obtained from the known sequence of data by a corresponding sequence of n numbers obtained from the recorded sequence of sensor data, summing the results of the n multiplications, and determining when the sequences match by identifying when the sum of the n multiplications has a peak. The controller commands can be based on the GPS data and the recorded sensor data. The controller may comprise both a feed-forward architecture and a feedback architecture, both of which are involved in creating the controller commands, and when the confidence is high the weight from the feed-forward input to the controller is higher than it is when the confidence is low. The plant may comprise a vehicle seat.

In another aspect a method includes establishing a confidence in a vehicle position along a path that is determined by a vehicle position determination system, and using the established confidence to change a behavior of an active suspension system of a seat in the vehicle. The active suspension system comprises a controller that outputs commands to an actuator to control motion of the plant. The controller comprises both a feed-forward architecture and a feedback architecture, both of which are involved in creating the controller commands.

In another aspect a system that suspends a plant relative to a floor of a vehicle that is adapted to travel along a road includes an active suspension, a sensor that senses at least one of motion or position of the plant relative to the floor, where the sensor has an output, a memory that holds road trajectory information, a vehicle position determination system, and a controller that is input with the sensor output, road trajectory information from the memory, and vehicle position information from the vehicle position determination system. The controller has first and second feed-forward variable weighting determinators and a feedback variable weighting determinator. The road trajectory information is provided to the first and second feed-forward variable weighting determinators, and the vehicle position information is provided to the first and second feed-forward variable weighting determinators and the feedback variable weighting determinator. When there is high confidence that the road trajectory information is correct, the weights for the feed-forward inputs and the feedback input are higher than they are when the confidence is low.

Embodiments may include one of the following features, or any combination thereof. Outputs of the first feed-forward determinator and the feedback determinator may be summed and provided to the active suspension. The output of the second feed-forward determinator and the output of the sensor may be differenced and inputted to the feedback determinator. The road trajectory information may comprise low frequency content of the road contour. The road trajectory information may be obtained by filtering measured road signals using a zero-phase filter to maintain the trajectory in phase with the road. The system may operate as both as a reactive active suspension system and as a feed-forward based active suspension system, wherein a behavior of the system is changed based on a confidence in the vehicle position that is determined by the vehicle position determination system.

BRIEF DESCRIPTION OF THE DRAWINGS

FIG. 3 shows an example alignment of measured and stored data to produce a confidence.

DETAILED DESCRIPTION

Vehicles can include active suspension systems for a plant that is part of or is carried by the vehicle. Different types of vehicles and plants, and plant active suspension systems (e.g., actively-suspended motor vehicle seats) are known in the field, for example as disclosed in U.S. Pat. Nos. 7,195,250, 8,095,268 and 8,725,351, the disclosures of which are incorporated herein by reference. The referenced patents also disclose vehicle position determination and the storage and use of vehicle trajectory plans.

In actively suspended vehicle seats it is typically not possible to have the control system control the seat top (i.e., the part of the seat that a user sits on) to have zero acceleration at all frequencies. For example, if the seat top were to have zero acceleration at DC, as the vehicle would start up a hill the seat top would not move inertially. At some point, the seat top would move to the bottom of its permitted range of travel and would sit against the end stops. This issue can be ameliorated by limiting the low frequency bandwidth that is controlled. That is, zero acceleration is not commanded at very low frequencies. Rather, at low frequencies the seat top is allowed to follow the truck floor. However, when the seat top follows the floor there is no vibration isolation.

Another problem is that the more the seat top is isolated, the more it seems to "float." For example, when zero acceleration is commanded at very low frequencies, the distance between the seat and the floor seems to change or "float" in an unnatural way. Furthermore, a consequence of limiting the low frequency bandwidth is that it introduces a phase offset between the truck floor and seat top at the frequencies where the commands transition to no isolation. This phase offset contributes to the "floating" sensation. The phase offset can be reduced by increasing the low frequency bandwidth, at the expense of vibration isolation.

Figure 1:
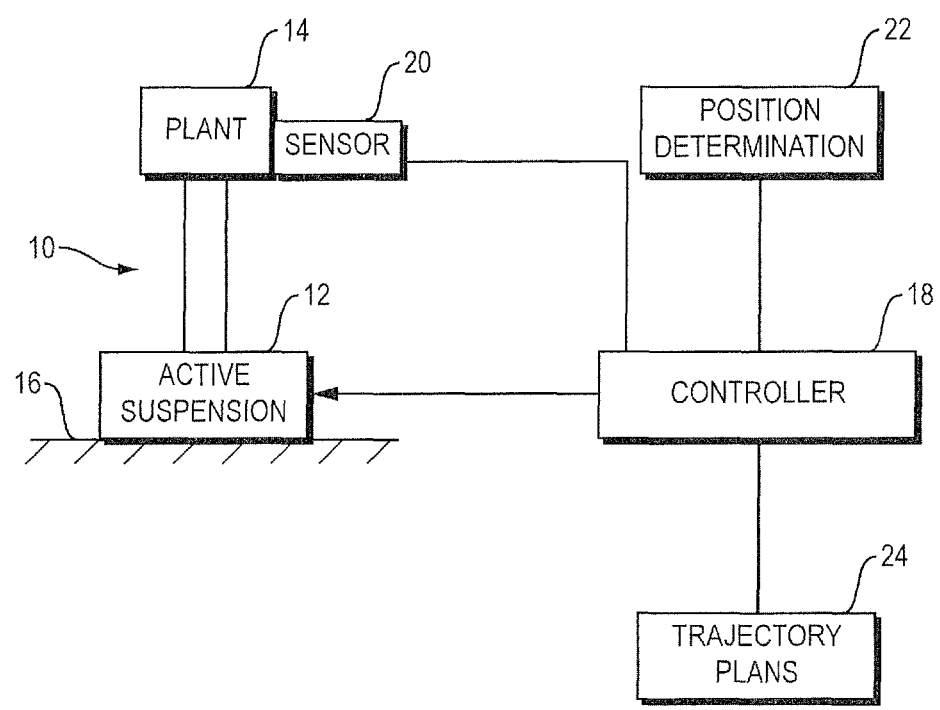
FIG. 1 is schematic diagram of a vehicle plant active suspension control system that can be used to accomplish the methods of the present disclosure.

FIG. 1 schematically depicts system 10 that actively suspends plant 14 (e.g., the seat top in a motor vehicle such as a truck) relative to vehicle floor/platform 16, using active suspension 12 under control of controller 18 that is input with data from sensor 20. Sensor 20 may be an accelerometer that detects accelerations of the top of a motor vehicle seat, or may be a position sensor that senses the relative position of the seat top with respect to the suspension base, as two non-limiting examples. System 10 can be used to remove or reduce the effect on a person sitting in the seat from vibrations and other motions of a truck floor. Vehicle plant active suspension control is known in the art, for example as described in the patents incorporated herein by reference.

The unnatural floating movement of the seat top described above can be addressed in the present disclosure in a manner that reduces or eliminates this floating yet still maintains isolation. In the present disclosure road contour information is provided to controller 18 by trajectory plans held in memory 24. The road trajectory may be comprised of the low frequency content of the road contour. Road trajectory information can be obtained by filtering the measured road signals using a zero-phase filter to maintain the trajectory in phase with the road. Trajectory information of the road contour along a path to be traveled by the vehicle is provided to controller 18 before the vehicle encounters the contours. The seat top is then commanded by controller 18 to follow the road trajectory that it has received. The control loop is controlling seat top motion to follow the road, rather than just having the passive seat suspension support the seat at low frequencies. A result is that vibration isolation is maintained, while the seat top floating problem is reduced or eliminated.

Advance information about road contour is fed into the active seat controller 18. The active suspension system is thus able to operate both as a reactive active suspension system and as a feed-forward based active suspension system. A behavior of the system is changed based on a confidence in the vehicle position that is determined by a vehicle position determination system 22. When there is high confidence that the advance road data from trajectory plans 24 is correct, the weight for the feed-forward input(s) from controller 18 is higher than it is when the confidence is low. Similarly the weight for the feedback input(s) may be lower when the confidence is low. The weightings can individually affect the gain and frequency content for both feed-forward inputs as well as the feedback input, including a gain of zero. This varies dynamically as the vehicle travels along a path.

Figure 2:
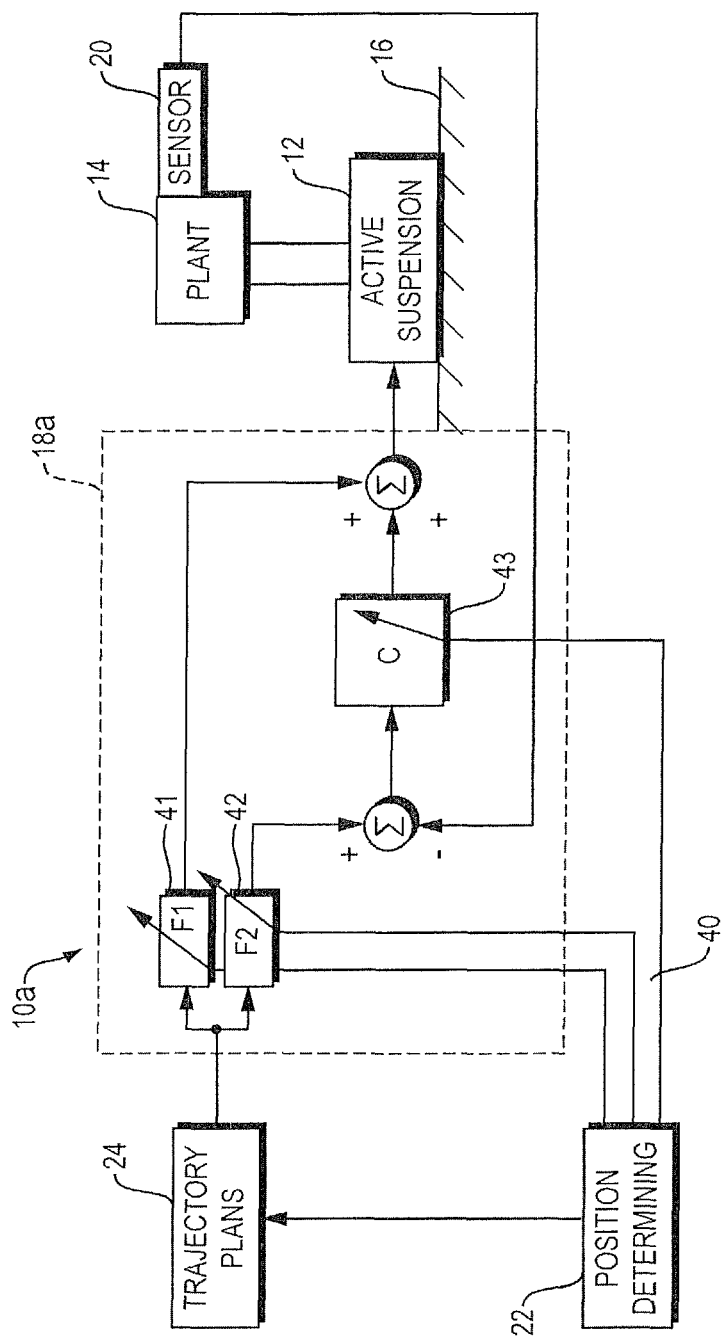
FIG. 2 is a more detailed schematic diagram showing components of an example of the controller.

FIG. 2 is a more detailed schematic diagram of a system 10a that suspends plant 14 relative to floor 16. System 10a differs from system 10, FIG. 1, only as to the detail of controller 18a, which is a non-limiting example of a controller that can be used in the subject system. Trajectory plans 24 and vehicle position 22 are provided to feed-forward variable weighting determinators 41 and 42. Vehicle position 22 is also provided to feedback variable weighting determinator 43. The outputs of determinators 41 and 43 are summed and provided to active suspension 12. The outputs of determinator 42 and sensor 20 are differenced and inputted to determinator 43. When there is high confidence that the advance road data from trajectory plans 24 is correct, the weight for the feed-forward inputs 41 and 42 is higher than it is when the confidence is low. Similarly the weight for the feedback input 43 may be higher when the confidence is low. The weightings 40 can individually affect the gain and frequency content for both feed-forward inputs 41 and 42 as well as the feedback input 43, including a gain of zero. This varies dynamically as the vehicle travels along a path.

The vehicle position on the path can be determined by position determination 22 in a desired, known fashion (e.g., using GPS data), for example as set forth in the prior art that is incorporated by reference herein. The confidence is determined in one non-limiting example by performing a cross correlation between position data being measured in real time by position determination module 22, and stored data describing the road contour. Note that it is possible to use some other data that can be correlated with road data without ever back calculating the actual road contour. For example, vehicle floor acceleration could be used, such as might be measured by an accelerometer (not shown) coupled to the floor. In each case there is stored data that is location tagged (e.g., a trajectory plan), and the measured data is compared to the stored data. The measured data stream is aligned with the stored data stream by doing a correlation measurement, and when the correlation spikes the data sets are aligned. Location can then be determined based on the stored data set. The higher the correlation measure the more confidence there can be in the location determination, and this correlation can be used as the confidence measure.

As an example of confidence determination let's consider a single bump as shown in the top subplot of FIG. 3, which illustrates bump height versus position along a path that has been traveled and recorded; the signal named "Measured" represents a measured bump. The middle subplot shows the stored recording of the bump height versus position along the path, at three different alignment offsets. The bottom subplot shows the confidence of the alignments versus position along the path. For the alignment offset1 the stored data and measured data are out of alignment and thus produce a low confidence shown by the square marker in the bottom subplot. For this condition the location of the bump is essentially unknown and the feed forward command signals 41 and 42 are weighted low while the feedback signals 43 are weighted high for the system to react to the bump. For alignment offset3 the stored data and measured data are in alignment perfectly and thus produce the highest confidence shown by the circle marker in the bottom subplot. For this condition the location of the bump is precisely known and the feed forward commands are weighted high to follow a desired trajectory and the feedback commands can be weighted low. For alignment offset2 the stored data and measured data are in partial alignment and produce a medium confidence shown by the triangle marker in the bottom subplot. For this condition the location of the bump is known with some uncertainty and the feed forward commands are weighted at a mid-level to influence the desired trajectory but also rely on the feedback commands to react to the difference in the expected bump and the measured bump. Also shown in the bottom subplot for completeness is the range of alignment confidence for all alignment offsets between the stored and measured bump (named Confidence Continuum).

A goal of the command weighting is to leverage the available information of the trajectory plan to augment the performance of the feedback controller. This strategy allows for maximum leverage of the stored information. Consider a partial alignment without weighting, depending on the amount of alignment error it could be possible to amplify road inputs from the truck floor to the seat top if the feed forward inputs produced the dominant command. With weighting, the same situation uses some of the trajectory to influence the motion of the seat top while maintaining a strong reliance on the feedback controller to react instantly to errors.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for controlling an active suspension system of a seat in a vehicle, the method comprising:
   determining an approximate location of the vehicle;
   calculating a level of confidence associated with the determined approximate location; and
   controlling the active suspension system of the seat based at least in part on the determined approximate location and the calculated level of confidence.

2. The method of claim 1 wherein controlling the active suspension system comprises:
   determining, by a controller, a command signal; and
   transmitting the control signal from the controller to an actuator of the active suspension system.

3. The method of claim 2 wherein determining, by the controller, the command signal comprises determining, using a feed-forward control algorithm, a first command based on the approximate location of the vehicle.

4. The method of claim 3 wherein determining, by the controller, the command signal further comprises:
   sensing a first parameter, wherein the first parameter is one of motion of a first component of the vehicle relative to a second component of the vehicle and position of the first component of the vehicle relative to the second component of the vehicle; and
   determining, using a feedback control algorithm, a second command based on the sensed first parameter.

5. The method of claim 4, wherein determining, by the controller, the command signal further comprises calculating a weighted sum of the first command and the second command, wherein a weight assigned to the first command is based on the level of confidence.

6. The method of claim 5 wherein the weight assigned to the first command is proportional to the level of confidence.

7. The method of claim 5 wherein the first component of the vehicle is the seat of the vehicle.

8. The method of claim 2 wherein determining the approximate location of the vehicle comprises:
   determining an initial vehicle location estimate using a global positioning system (GPS),
   recording a sequence of sensor data from one or more sensors attached to the vehicle, and
   refining the initial vehicle location estimate by performing pattern matching to correlate the recorded sequence of sensor data to a known sequence contained in reference data.

9. The method of claim 8 wherein the reference data comprises a plurality of sequences consisting of n numbers, and wherein the pattern matching is performed by
   (a) multiplying a sequence of the plurality of sequences by a corresponding sequence of n numbers obtained from the recorded sequence of sensor data,
   (b) summing the results of the n multiplications,
   (c) repeating steps (a)-(b) using a different sequence of the plurality of sequences, and
   (d) identifying the specific sequence of the plurality of sequences for which the sum of the n multiplications has a peak value.

10. The method of claim 2, wherein determining the command signal comprises:
    determining, using a feed-forward control algorithm, a first command based on the approximate position of the vehicle;
    sensing at least one of motion of a component of the vehicle and position of the component of the vehicle;
    determining, using a feedback control algorithm, a second command based on the sensed at least one of motion of the component and position of the component; and
    calculating a weighted sum of the first command and the second command, wherein a weight assigned to the first command is based on the level of confidence.

11. A system for suspending seat relative to a floor of a vehicle, the system comprising:
    an active suspension that includes at least one actuator positioned to apply a force to the seat;
    a sensor configured to sense a first parameter, wherein the first parameter is one of motion of the seat relative to the floor and position of the seat relative to the floor;
    a non-transitory memory that stores road trajectory information;
    a vehicle position determination system configured to determine an approximate location of the vehicle; and
    a controller in communication with the sensor, the memory, the at least one actuator of the active suspension, and the vehicle position determination system, wherein the controller is configured to:
predict, based at least in part on the approximate location of the vehicle and a portion of the road trajectory information stored in the memory, an upcoming road trajectory;
calculate a first level of confidence associated with the predicted upcoming road trajectory;
determine, based at least in part on the first level of confidence, a command signal for the at least one actuator of the active suspension.

12. The system of claim 11 wherein the controller is configured to:
determine, using a first feed-forward algorithm, a first command based at least in part on the approximate location of the vehicle;
determine, using a feedback algorithm, a second command based at least in part on the first parameter; and,
determine the command signal by calculating a weighted sum of the first command and the second command, wherein a weight assigned to the first command is based on the first level of confidence.

13. The system of claim 11, wherein the vehicle position determination system is further configured to determine a second level of confidence associated with the approximate location of the vehicle; and wherein the controller is configured to determine, based in part on the second level of confidence, the command signal.

* * * * *